Dec. 18, 1923.   1,478,246
S. OTIS
AUTOMATIC HOT WATER SUPPLY FOR TANKS
Filed July 3, 1919   2 Sheets-Sheet 1
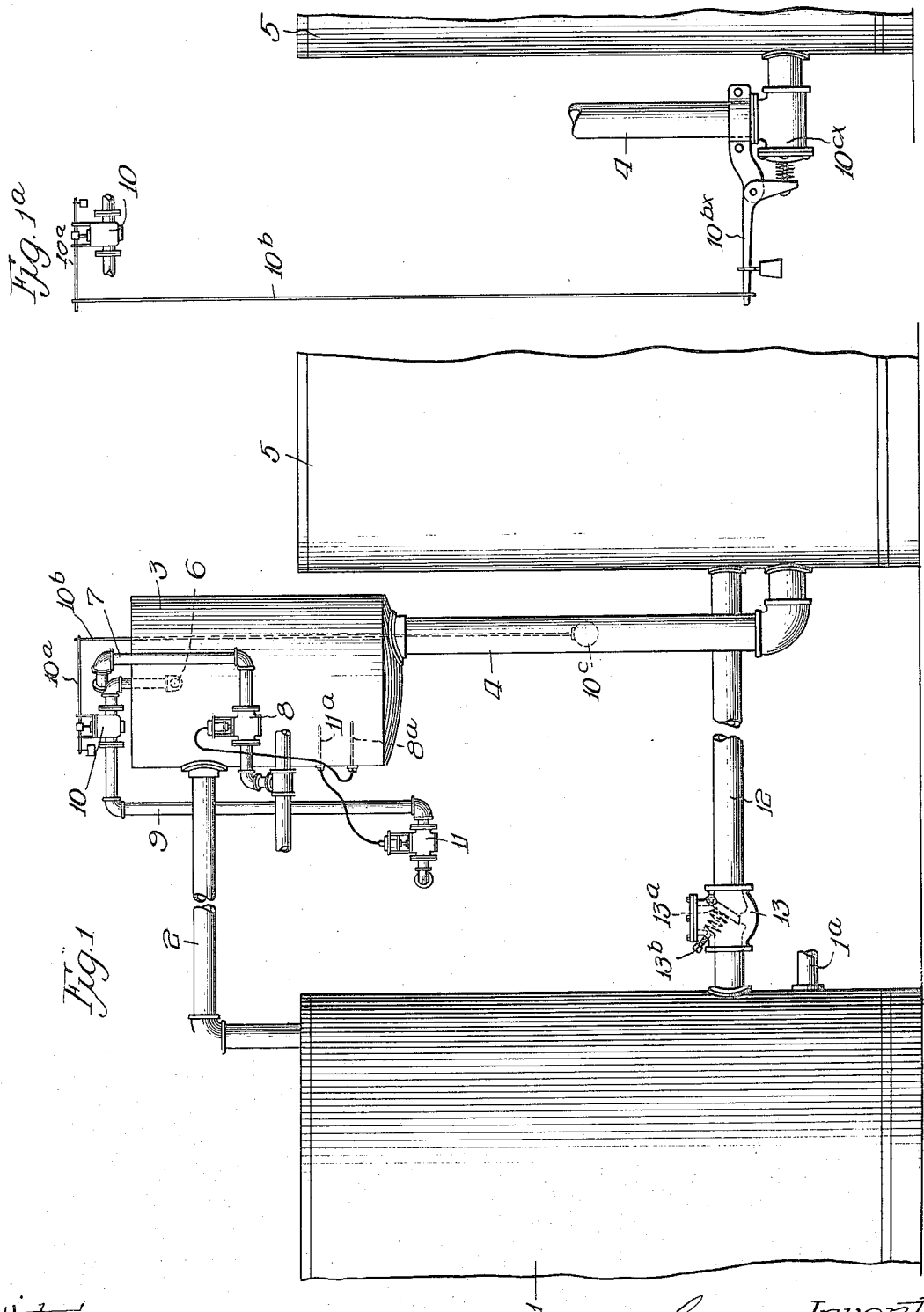

Dec. 18, 1923.
S. OTIS
1,478,246
AUTOMATIC HOT WATER SUPPLY FOR TANKS
Filed July 3, 1919     2 Sheets-Sheet 2
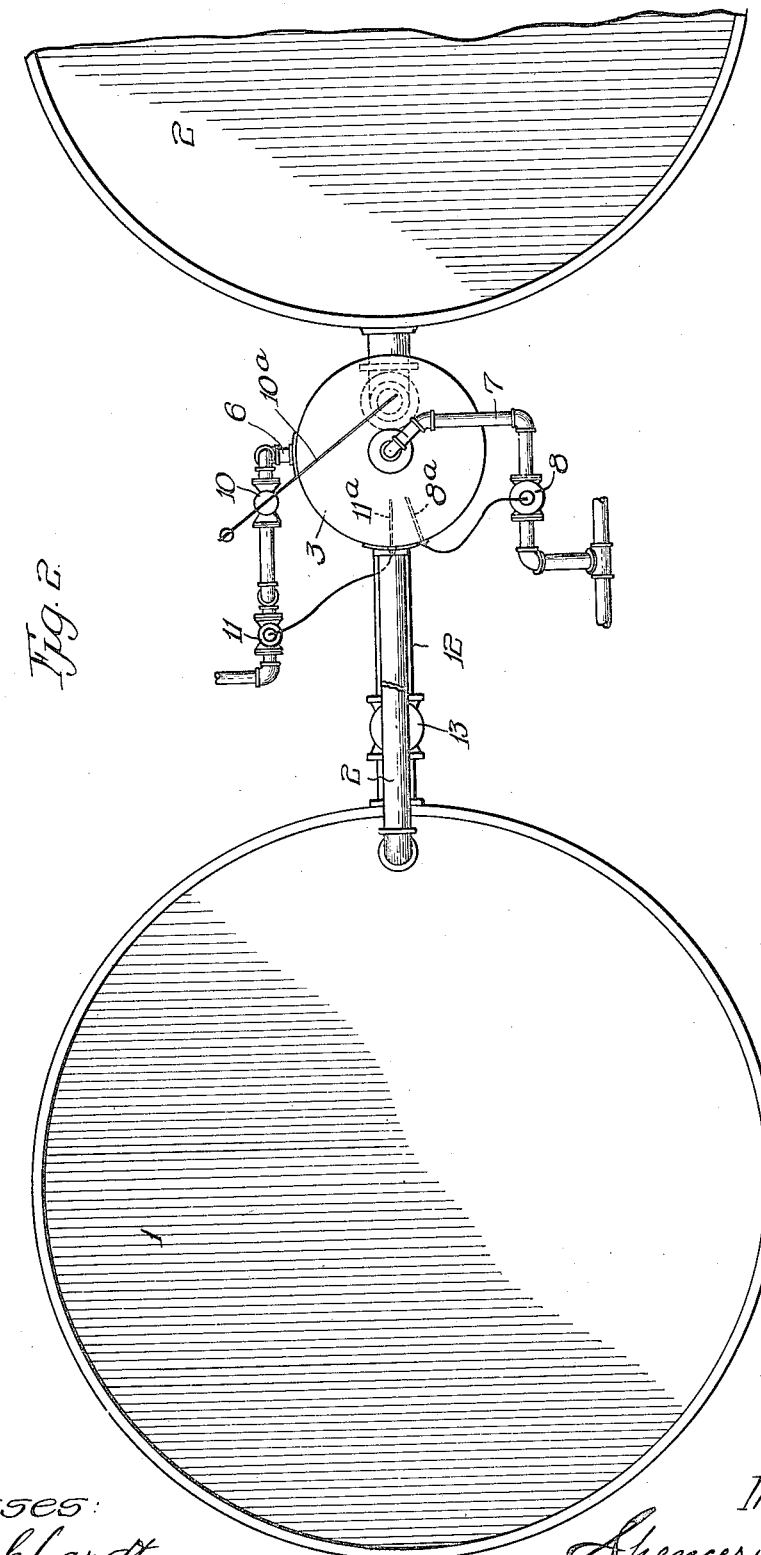

Patented Dec. 18, 1923.

1,478,246

UNITED STATES PATENT OFFICE.

SPENCER OTIS, OF CHICAGO, ILLINOIS.

AUTOMATIC HOT-WATER SUPPLY FOR TANKS.

Application filed July 3, 1919. Serial No. 308,616.

*To all whom it may concern:*

Be it known that I, SPENCER OTIS, a citizen of the United States, residing at Chicago, in the county of Cook and State of Illinois, have invented certain new and useful Improvements in Automatic Hot-Water Supplies for Tanks, of which the following is a specification.

This invention is intended primarily for embodiment in apparatus for washing out and refilling boilers, for instance, boilers of steam locomotives, and according to which, in advance of the steps of washing out the boiler and refilling it with clean hot water, the existing water and steam are blown off from the boiler and, for the sake of economy, are collected so that the steam may be separated, condensed, and delivered with the condensing water to a filling tank at a temperature suitable for refilling purposes, while the unevaporated water is saved and, after settlement of the sludge therein, is used for washout purposes.

In the operation of systems of this kind it sometimes happens that the supply of filling water, which accumulates from condensed steam and water used in spraying the same, is insufficient so that the supply in the filling tank runs low, and the deficiency has to be made up with cold water from the normal service pipes.

A primary object of the present invention is to automatically maintain an adequate supply of hot water in the filling tank at all times, by introducing hot water into the tank whenever the contained water drops below a predetermined level.

Accordingly, the principal feature of the present invention consists in providing in a system of the kind referred to, and in combination with its blowoff steam condenser or other water heater, means for delivering to said heater a supply of water preferably in the form of a condenser spray, together with means whereby a heating medium, preferably a supply of steam independent of the blowoff steam is delivered into said heater in relation to transfer its heat to the water delivered thereto and in volume sufficient to raise the temperature of such water before it reaches the tank to a degree that renders it suitable for use for re-filling boilers; the heating medium delivery being automatically controlled by the level of the water in the tank, and the water delivery being controlled by the arrival of the heating medium in the heater, and independently of the temperature of the main body of water in the tank.

One subordinate feature of the invention incident to the above-mentioned principal feature consists in having the steam valve influenced directly by the level of water in the filling tank, and the water valve governed indirectly thereby, to-wit: through a thermostat which is affected by the presence of the steam released to the condensing space by the falling of the water level.

Another subordinate feature of the invention consists in providing means whereby the delivery of steam from the independent source to the condensing space will be arrested in case blowoff steam should begin to arrive while the filling water is being replenished; this being preferably accomplished by having a steam cut-off valve thermostatically responsive to an excessive temperature in the condenser.

Another object of the present invention is to provide means whereby when the water level reaches a lower limit in a tank that is without replenishing apparatus, it will be replenished with water from a tank that is supplied with hot water replenishing apparatus, such, for instance, as that herein described; to which end, a further feature of the invention consists in providing a low level cross-over connection between two such tanks, preferably with a valve therein to check return flow between them.

In the accompanying drawings—

Figure 1 is a side elevation showing the washout tank and the filling tank of a boiler washing system, and with the automatic hot water replenishing apparatus applied in accordance with one embodiment of the present invention.

Figure 1ª is a detail view showing a modified means for bringing the steam valve under control of the water level of the tank; and Figure 2 is a plan view of the apparatus shown in Figure 1.

1 represents a washout tank, preferably in the form of a combined separator and washout tank; 2 a cross-over pipe conducting away steam that arises from the flow of water delivered to said tank; 3 a spray condenser in which said steam is to be condensed; and 4 a drain pipe through which water accumulating from the spray and condensation may pass to a filling tank 5, These elements, as well as their general method of association, were known prior to the present invention, and this is also true of a portion of the equipment associated with the condenser, to-wit; spray nozzle 6, water pipe 7 supplying the same, and thermostatically controlled water valve 8 introduced in the pipe 7 and controlled by the bulb $8^a$ introduced near the bottom of the condenser for causing the valve to open pipe 7 whenever the temperature in the condenser, due, for instance, to the presence of steam therein, rises above a predetermined degree, for instance 190° F., and therefore starting the spray water flowing whenever steam in sufficient quantity enters the condenser by way of the cross-over pipe 2.

According to the present invention, means are provided whereby a spray of water, and steam in sufficient volume to bring it up to a temperature suitable for filling purposes, will be brought together in the condenser 3 whenever the supply of filling water in the tank 5 drops to a predetermined level; this being preferably accomplished by utilizing the condensing spray primarily provided for condensing steam from the blowoff water as well as the automatic thermostatic control of said water—in other words, using the existing condenser equipment for the purpose. Accordingly, the steam pipe 9, having a valve 10 controlled by the water level in the tank 5, is arranged to deliver steam to the condenser 3 whenever the supply of filling water reaches the predetermined low level, and the presence of this steam acts upon the bulb $8^a$ to release the valve 8 and start the water spray that will replenish the supply of water in the tank 5, and, by condensing the steam from the steam pipe, have its temperature raised so that it will be suitable for filling purposes. This delivery of steam and water is arranged so that it will continue until the desired upper level is restored in the tank.

One means for controlling the valve 10 may consist in an unseating lever $10^a$, on the end of which is suspended, by a flexible connector $10^b$, a float ball $10^c$ in the pipe 4 which leads from the condenser to the tank and which is tapped into the tank at a sufficiently low point to always insure in the pipe 4 the same level that obtains in the tank 5. Ball $10^c$ has sufficient weight to unseat the valve 10 when the water recedes to a point below the ball, but has sufficient buoyancy to relieve the valve lever $10^a$ of its weight so long as the ball is submerged.

Another method of controlling the valve 10 is illustrated in Figure $1^a$, according to which a bell crank lever $10^{bx}$, with an adjustable weight thereon, has one arm connected to the flexible connector $10^b$ depending from the lever $10^a$, while its other arm is connected with a diaphragm $10^{cx}$ and is subject to hydrostatic pressure in the tank 5. So long as the level of water in the tank 5 is above a predetermined lower limit, pressure on diaphragm $10^{cx}$ will sustain the lever $10^{bx}$ and relieve the valve lever $10^a$. Whenever pressure on the diaphragm $10^{cx}$ is sufficiently reduced by the attainment of a low level in tank 5, the lever $10^{bx}$ may respond to its weight sufficiently to depress the valve lever $10^a$ and so release steam to the interior of the condenser 3.

It may be important, from the standpoint of economy, to avoid delivery of steam from the auxiliary source 9, 10, at times when steam from the blowoff water is entering through the cross-over pipe 2. For this purpose an additional valve 11 is introduced in the auxiliary steam supply pipe 9, and this is subjected to thermostatic control preferably through an independent bulb $11^a$ in the condenser 3, the tension of the valve being adjusted so that it will respond to a temperature such as would develop in the condenser from the arrival of steam from both sources. Thus, if the operation of replenishing has automatically occurred in the condenser 3, and steam should begin to arrive through the cross-over pipe 2 as a result of a locomotive blowing off in the combined washout tank and separator 1, the excess of steam in the condenser 3 would affect the bulb $11^a$ and shut off the normally open valve 11, so that the auxiliary supply of steam would be interrupted and the replenishing operation would then proceed by continuance of the water spray and the condensation of the steam from the blowoff water.

In order to maintain an adequate supply of water in the washout tank in case the drainage on that tank exceeds the water supplied therein by blowing off boilers, a pipe 12 connects tank 1 with tank 5 at a point sufficiently low in the two tanks to insure a level in the tank 1 within reach of the drawing off connections, for instance, the float drainage pipe $1^a$. A return-flow check valve 13 in the pipe 12 prevents the impure water from tank 1 flowing backward into tank 5. By means of a loading spring $13^a$, adjustable through set-screw $13^b$, valve 13 may be arranged to open only when the water gets under the lower limit in tank 1, and thereby avoid flow of pure water from tank 5 at unnecessary times, as, for instance, when the water in tank 1, though plentiful, nevertheless may be slightly below the level of water in tank 5. In this way tank 1 would be safeguarded against drop of the water level to a point that would render it inoperative, and yet would not draw water from tank 5 so long as the level remained above the limit.

From the foregoing description it will be observed that the water level actuated valve controlling device controls both the water supply and the heating medium supply, the latter directly and the former indirectly, and the water replenishing equipment insures a water supply in both the filling tank 5 and the washout tank 1, the former directly and the latter indirectly.

I claim:

1. In a water circulating system, a supply tank, a heater, a water supply and a heating medium supply both delivering to said heater, a water-level actuated device in said tank controlling said heating medium supply, and means located in said heater whereby arrival of heating medium therein causes release of the water supply.

2. In a water circulating system, a supply tank, a water supply, a steam supply adapted to heat said water supply, valves respectively controlling said supplies, a water-level actuated means controlling said steam supply, and means whereby release of the steam releases the valve of the water supply.

3. In a water circulating system, a supply tank, a water supply, a steam supply, valves controlling the respective supplies, a water-level actuated means controlling the steam supply, and a thermostatic device controlling the water supply and subject to the heating effect of steam released from the steam supply.

4. In a water circulating system, a supply tank, a condenser delivering into said supply tank, a water supply for said condenser and a steam supply for said condenser having a steam releasing valve and a steam shut off valve, water-level actuated means controlling the steam releasing valve, and a thermostatic means controlling the steam shut off valve.

5. In a water circulating system, a supply tank, a condenser delivering water to said tank, a thermostatically controlled water supply for said condenser, a water-level released steam supply for said condenser, and a thermostatically controlled shut-off for the steam supply.

6. In a water circulating system, a supply tank, a condensing chamber delivering to said supply tank, steam and water supplies delivering to said condensing chamber, a water-level actuated releasing valve for the steam supply, a valve having a thermostatic control subject to temperature in the condensing chamber for controlling the water supply, and a shut-off valve for the steam supply also having a thermostatic control that is subject to temperature in the condensing chamber.

7. In a boiler refilling system, the combination of a separator adapted to receive blowoff water, a condenser receiving steam from said separator, a water spray for said condenser, a thermostat in said condenser controlling said water spray, a tank to which said condenser delivers, and an auxilliary steam supply delivering into said condenser controlled by the level of the water in said tank.

8. In a boiler refilling system, the combination of a separator adapted to receive blowoff water from a boiler, a condenser receiving steam from said separator, a tank receiving water from said condenser, an auxiliary steam supply discharging into said condenser, a water supply for said condenser and a valve for said water supply having a thermostatic controlling device responsive to heat effect developed by steam delivered to said condenser from either the separator or the auxilliary steam supply.

9. In a boiler refilling system, the combination of a separator adapted to receive blowoff water from a boiler, a condenser receiving steam from said separator, a tank receiving water from said condenser, an auxiliary steam supply discharging into said condenser, a water supply for said condenser, and a valve for said water supply having a thermostatic controlling device responsive to heat effect developed by steam delivered to said condenser from either the separator or the auxiliary steam supply; said auxiliary steam supply having a shut-off valve with a thermostatic control responsive to the combined heating effects of steam from both the separator and the auxiliary steam supply.

10. In a water circulating system, two supply tanks having a connection through which water may flow from one to the other, one of said tanks being provided with a water supply, a heating medium supply, a valve for controlling the water supply which is in turn controlled by the delivery of heating medium and a water-level actuated device controlling said heating medium supply, the connection between the tanks being provided with a back-flow check valve.

11. In a water circulating system, two supply tanks having a connection through which water may flow from one to the other, one of said tanks being provided with a water supply, a heating medium supply, means responsive to the presence of the heating medium, controlling the water supply, a valve for controlling the water supply, and a water-level actuated device controlling said heating medium supply; the connection between said tanks being located at a low level therein and provided with a back-flow check valve having means for yieldingly loading it against opening to determine the difference of level in the tanks which will induce flow of water from one to the other.

12. In a boiler washing system, the combination of a washout tank receiving blown off water, a condenser receiving steam from the blown off water, a filling tank receiving water from said condenser, a connection between the lower portions of said tanks whereby water level in the washout tank is maintained from the filling tank, and a water spray adapted to condense steam received by said condenser and thereby replenish the filling tank.

13. In a boiler washing system, the combination of a washout tank receiving blown off water, a condenser receiving steam from the blown off water, a filling tank receiving water from said condenser, a connection between the lower portions of said tanks whereby water level in the washout tank is maintained from the filling tank, and a water spray adapted to condense steam received by said condenser and thereby replenish the filling tank; said condenser also having an auxiliary steam supply controlled by the water level in the filling tank.

Signed at Chicago, Illinois, this 25th day of June, 1919.

SPENCER OTIS.